3,468,730
PROPELLANT COMPOSITION CONTAINING AN ORGANIC TETRAZOLE DERIVATIVE AND METAL OXIDIZER

Heinz Gawlick, Furth; Gunther Marondel, Erlangen, Hellmut Bendler, Nuremberg, and Werner Siegelin, Stein, near Nuremberg, Germany, assignors to Dynamit Nobel Aktiengesellschaft, Troisdorf, Germany
No Drawing. Filed Feb. 16, 1968, Ser. No. 705,912
Claims priority, application Germany, Feb. 17, 1967, D 52,299
Int. Cl. C06b 1/00, 15/00; G05
U.S. Cl. 149—61                                   11 Claims

ABSTRACT OF THE DISCLOSURE

The present disclosure relates to a propellant charge for switching elements, for the triggering of switching elements and/or for control processes. More particularly, the present disclosure is directed to a propellant composition which comprises about 10 to 50% by weight of a tetrazole derivative which exhibits a melting point of at least about 90° C., a decomposition point of at least about 140° C., has a nitrogen content of at least about 40% by weight and is resistant to friction and shock and about 90 to 50% by weight of an oxygen carrier.

Background of the invention

The present invention relates to a propellant composition which is effective for switching elements, for triggering switching elements, for various control processes, and the like. More particularly, the present invention is concerned with a propellant composition comprising a tetrazole derivative and an oxygen carrier. The tetrazole derivative has a nitrogen content of at least about 40% by weight and exhibits a melting point of at least about 90° C. and a decomposition point of at least about 140° C.

For triggering, switching and control processes, elements are well known comprising a piston provided with a sleeve wherein said piston is moved by a propellant charge which is ignitable electrically against a force acting upon it from the outside, thereby actuating a device connected thereto. Since these switching elements involve components which are of a relatively small dimension and thus are acocrdingly more or less sensitive, and furthermore are frequently employed in very sensitive devices and appliances, the previously available propellant charges, such as powders and primer compositions, are often unsuitable. This is because the conversion thereof or the reaction takes place very rapidly thus producing the danger of destroying the element or the device connected therewith. An additional disadvantage of the prior art propellant charges is that the propellant gases developing during the conversion or reaction have components which can produce a corrosion of the metallic parts of the switching elements, as well as the devices and appliances connected therewith. This cannot be tolerated, especially since the switching elements, as well as the devices actuated thereby remain at the same location, and in many cases over long periods of time, even after they are triggered or activated.

Summary of the invention

An object of the present invention is to avoid the prior art disadvantages in the use of a propellant charge for switching elements, for the triggering of switching elements and for various control processes.

Another object of the present invention is to provide an improved propellant composition which is resistant to friction and shock and which develops propellant gases which are not corrosive to the metallic parts of the switching elements.

A further object of the present invention is to provide an improved propellant composition which provides a substantially controlled reaction or conversion thereby minimizing the danger of destroying the elements or the devices connected therewith.

Other objects and further scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

Pursuant to the present invention, it has been found that the above-mentioned disadvantages may be eliminated by the use of the propellant composition of the present invention which comprises about 10 to 50% by weight of a tetrazole derivative exhibiting a melting point of at least about 90° C., a decomposition point of at least baout 140° C. and having a nitrogen content of at least about 40% by weight, and about 90 to 50% by weight of an oxygen carrier. Advantageously, the tetrazole derivative is no more sensitive to shock and friction than tetranitromethylaniline.

The tetrazole derivative comprise compounds which exhibit the aforementioned properties and include, for example, materials such as 5-aminotetrazole, guanylamino-5-tetrazole or 1-guanyl-3-tetrazolyl-5-guanidine. In place of a tetrazole derivative, it is also possible to employ, for example, oxalyl hydroxamic acid, in which case an oxygen carrier can, in certain cases, be completely omitted.

The oxygen carrier which can be used in the propellant composition of the present invention includes such oxidizers as, for example, barium nitrate, potassium dichromate, potassium nitrate, lead dioxide, copper oxide, manganese dioxide (pyrolusite), and the like.

According to the present invention about 10 to 50% by weight of a tetrazole derivative such as 5-aminotetrazole is mixed with about 90 to 50% by weight of an oxygen carrier such as potassium nitrate and formulated into a propellant charge for switching elements. Upon initiation of the switching elements, the propellant composition exhibits a controlled reaction with the evolution of gases which are not corrosive to the metallic parts of the switching element.

The invention being thus described, it will be obvious that the same may be varied in many ways. Such variations are not to be regarded as a departure from the spirit and scope of the invention, and all such modifications are intended to be included within the scope thereof.

What is claimed is:

1. A propellant composition which comprises about 10 to 50% by weight of an organic tetrazole derivative which exhibits a melting point of at least about 90° C., a decomposition point of at least about 140° C. and is resistant to friction and shock, and about 90 to 50% by weight of an oxidizer selected from the group consisting of metal salts and metal oxides.

2. The composition of claim 1 wherein the organic tetrazole derivative is selected from the group consisting of 5-aminotetrazole, guanylamino-5-tetrazole, and 1-guanyl-3-tetrazolyl-5-guanidine.

3. The composition of claim 1 wherein the tetrazole derivative has no more sensitivity to shock and friction than tetranitromethylaniline.

4. The composition of claim 1 wherein the tetrazole derivative has a nitrogen content of at least about 40% by weight.

5. The composition of claim 1 wherein the oxidizer is selected from the group consisting of barium nitrate, potassium dichromate, potassium nitrate, lead dioxide, manganese dioxide, and copper oxide.

6. A propellant composition for switching elements, for triggering switching elements, for control processes and the like which comprises about 10 to 50% by weight of an organic derivative selected from the group consisting of 5-aminotetrazole, guanylamino-5-tetrazole, and 1-guanyl-3-tetrazolyl-5-guanidine and about 90 to 50% by weight of an oxidizer selected from the group consisting of metal salts and metal oxides.

7. The composition of claim 6 wherein the oxidizer is selected from the group consisting of barium nitrate, potassium dichromate, potassium nitrate, lead dioxide, manganese dioxide and copper oxide.

8. A propellant composition for switching elements, for triggering switching elements, for control processes and the like which comprises about 10 to 50% by weight of an organic tetrazole derivative which exhibits a melting point of at least about 90° C., a decomposition point of at least about 140° C., a nitrogen content of at least about 40% by weight, and a resistance to friction and shock, said tetrazole derivative being selected from the group consisting of 5-aminotetrazole, guanylamino-5-tetrazole, and 1-guanyl-3-tetrazolyl-5-guanidine and about 90 to 50% by weight of an oxidizer selected from the group consisting of barium nitrate, potassium dichromate, potassium nitrate, lead dioxide, manganese dioxide and copper oxide.

9. A propellant composition which comprises a member selected from the group consisting of about 10 to 50% by weight of an organic tetrazole derivative and up to 100% by weight of oxalyl hydroxamic acid mixed with up to about 90% by weight of an oxidizer selected from the group consisting of metal salts and metal oxides, said organic tetrazole derivative exhibiting relative friction and shock resistance, a melting point of at least about 90° C. and a decomposition point of at least about 140° C.

10. The composition of claim 9 consisting essentially of oxalyl hydroxamic acid.

11. The composition of claim 9 consisting essentially of a mixture of oxalyl hydroxamic acid and up to about 90% by weight of a mild oxidizer selected from the group consisting of barium nitrate, potassium dichromate, potassium nitrate, lead dioxide, manganese dioxide, and copper oxide.

References Cited

UNITED STATES PATENTS

| 1,511,771 | 10/1924 | Rathsburg | 149—109 |
| 3,055,911 | 9/1962 | Finnegan et al. | 149—109 X |
| 3,096,312 | 7/1963 | Henry | 149—109 X |
| 3,138,609 | 6/1964 | Carpenter | 149—109 X |
| 3,354,172 | 11/1967 | Takacs | 149—109 X |
| 3,386,968 | 6/1968 | Carpenter | 149—109 X |

CARL D. QUARFORTH, Primary Examiner

S. J. LECHERT, Jr., Assistant Examiner

U.S. Cl. X.R.

149—109